June 15, 1965 H. RINGLER 3,188,721

MAGNETIC CORE MEMORIES

Filed April 14, 1961 2 Sheets-Sheet 1

INVENTOR:
Heinz Ringler

By [signature] Atty.

INVENTOR

Heinz Ringler by Erwin Salzer

Atty.

United States Patent Office 3,188,721

Patented June 15, 1965

3,188,721

MAGNETIC CORE MEMORIES

Heinz Ringler, Bad Homburg vor der Hohe, Germany, assignor to Telefonbau und Normalzeit G.m.b.H., Frankfurt am Main, Germany, a firm

Filed Apr. 14, 1961, Ser. No. 102,986
6 Claims. (Cl. 29—155.5)

This invention is concerned with magnetic core memories, and more particularly with magnetic core memories including toroidal ferrite cores.

Memories of this character are widely used in computers, both as switching means and as storage means for intelligence.

This invention relates to novel methods for manufacturing memory structures.

In conventional magnetic core memories a plurality of individual toroidal cores are arranged to form a predetermined pattern, which is generally a square lattice pattern. Conductors or wires for the magnetic control of the cores are threaded through the center regions thereof and form a kind of weave which supports the cores. These conductors or wires thus have dual functions, i.e. they are magnetic control means and core-supporting means. The ends of the aforementioned conductors or wires are soldered to lugs provided in a frame structure supporting the particular magnetic memory.

It is a general object of this invention to provide a method for manufacturing magnetic memories capable of performing all the functions of memories of the aforementioned character, but not being subject to some of the drawbacks and disadvantages of magnetic memories of the aforementioned character.

To wire magnetic memories of the aforementioned character is a relatively difficult and complex task calling for relatively complex jigs and fixtures.

It is, therefore, one object of this invention to provide a method for manufacturing magnetic core memories which can be carried into effect without resorting to relatively complex jigs and fixtures.

Another drawback of prior art memories of the aforementioned character resides in the fact that the core-energizing conductors or wires thereof are necessarily subjected to stresses and strains since they must operate as core supports.

It is, therefore, another object of the invention to provide a method for manufacturing magnetic core memories wherein the individual cores are supported by means other than the core-energizing conductors or wires of the memories.

The foregoing and other general and special objects of the invention and advantages thereof will more clearly appear from the particular description of the invention, as illustrated in the accompanying drawings wherein.

Figure 1:
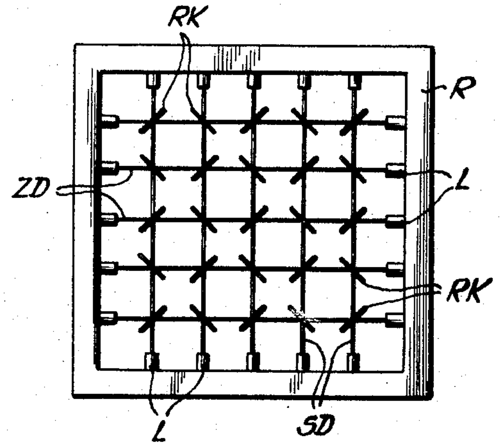
FIG. 1 is a front elevation of a conventional prior art core memory.

Referring now to the drawings, and more particularly to FIG. 1 thereof, letter R has been applied to indicate a frame supporting the ends of horizontal wires ZD and of vertical wires SD. Wires ZD and SD project through the center regions of a plurality of toroidal cores RK. The ends of wires ZD and SD enter into solder lugs in frame R, where they are firmly held in position.

Figure 2:
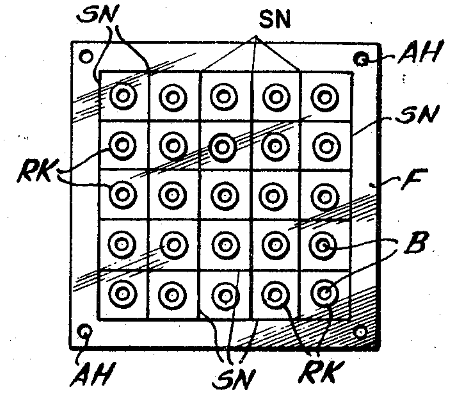
FIG. 2 is a similar front view of a core memory manufactured according to this invention.
Figure 3:
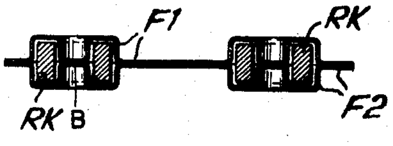
FIG. 3 is a section through a detail of the structure of FIG. 2 being drawn on a larger scale than FIG. 2 and including an axial section of a constituent toroidal core and its adjacent parts.

In the embodiment of the invention illustrated in FIGS. 2 and 3 the toroidal cores RK are arranged in a predetermined pattern, preferably a square lattice pattern, between a pair of pliable sheets. These sheets are preferably made of a thermoplastic synthetic substance adapted to be welded by the application of heat and pressure. As shown in FIG. 3 plastic sheets $F_1$ and $F_2$ sandwiching the toroidal cores RK are shaped or pre-fabricated to jointly define a plurality of substantially toroidal chambers, each for accommodating one of the toroidal cores RK. Sheets $F_1$ and $F_2$ have also inwardly projecting portions coextensive with the center regions of toroidal cores RK, and these inwardly projecting portions engage each other and are fused or welded together. These points of internal adhesion of sheets or foils $F_1$ and $F_2$ which are concentric with cores RK may be considered as a first system of sheet-connecting welds. The structure further comprises a second system of sheet-connecting welds. This second system of welds consists of horizontal strip welds SN extending along the spaces formed between horizontal rows of cores RK and vertical strip welds SN extending along the spaces formed between vertical rows of cores RK. Strip welds SN further form a barrier around all of the cores RK, thus precluding the outer cores RK from moving relative to sheets $F_1$, $F_2$. Thus a plurality of gas-tight and liquid-tight chambers or pockets is established between sheets $F_1$ and $F_2$ of which each accommodates, or houses, a toroidal core RK. Each sheet or foil $F_1$, $F_2$ is provided with a plurality of perforations B (FIG. 2) in registry with the center region of one of cores RK. If desired sheets $F_1$, $F_2$ may first be perforated adjacent the centers of cores RK, whereupon welds may be established along the periphery of perforations B, thus completing the sealing-in process of cores RK. The area of sheets $F_1$, $F_2$ which sandwiches cores RK, is surrounded by a margin F having twice the thickness of each single sheet $F_1$, $F_2$. Margin F supports a number of eyelets AH, or equivalent fastener means. Eyelets AH are intended to affix the magnetic memory to a frame support of the same character as frame support R shown in FIG. 1. In the elevation shown in FIG. 2 this frame supports registers with the margin F of sheets $F_1$, $F_2$ and, therefore, cannot be seen. If desired, means for suspending or supporting the magnetic memory such as the aforementioned eyelets AH may be arranged at points other than margin F.

Figure 4:
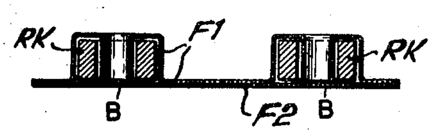
FIG. 4 is a section similar to that of FIG. 3 showing a modification of the structure of FIG. 3.

In FIG. 4 the same reference characters have been applied as in FIG. 3 to indicate like parts. FIG. 4 differs from FIG. 3 in that in the former but sheet F has been pre-formed to define therein a plurality of core-receiving recesses, whereas sheet $F_2$ forms but a flat surface. In the arrangement of FIG. 3 both sheets $F_1$ and $F_2$ have been pre-formed to define therein a plurality of registering core-receiving recesses.

Figure 5:
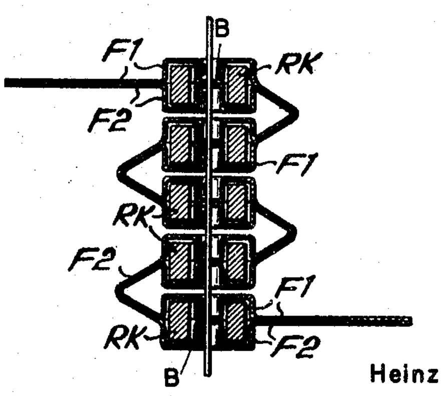
FIG. 5 is a vertical section through a memory according to FIG. 2 showing a step in the process of manufacturing the same.

FIG. 5 shows the same structure as FIG. 3 subsequent to performing a folding operation on sheet support $F_1$, $F_2$. Sheet support $F_1$, $F_2$ is being folded substantially in zigzag fashion, thereby effecting registration of groups of cores RK. FIG. 5 shows five such cores arranged in registry, or superimposed, by the aforementioned sheet-folding process. Upon folding of sheets $F_1$, $F_2$ conductor or wire SD, ZD is being threaded through the center regions of superimposed or stacked cores RK. Stacking of cores RK, as shown in FIG. 5, greatly facilitates the process of wiring the core memories. After wire SD, ZD has been threaded through all stacked cores RK, sheet support $F_1$, $F_2$ is at least partially unfolded, thereby relocating cores RK substantially in a common plane as shown in FIGS. 2–4.

Figure 6:
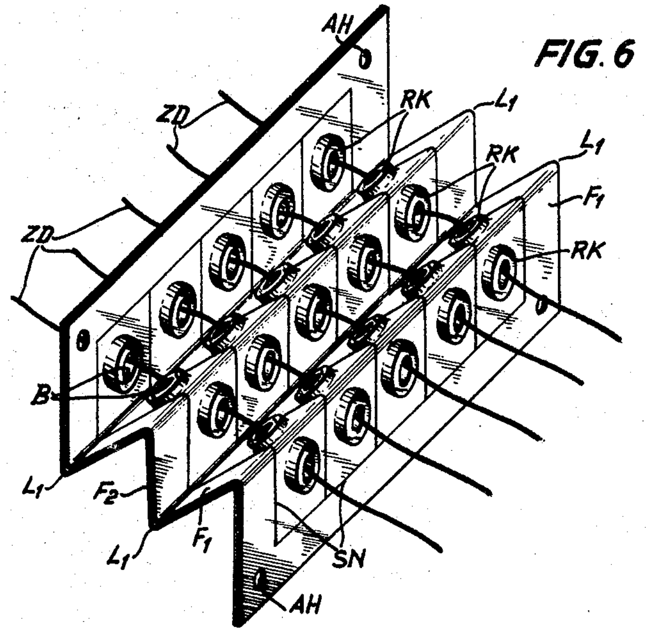
FIGS. 6 and 7 are isometric views of a memory according to FIG. 2 each figure showing a different step in the process of manufacturing the same.
Figure 7:
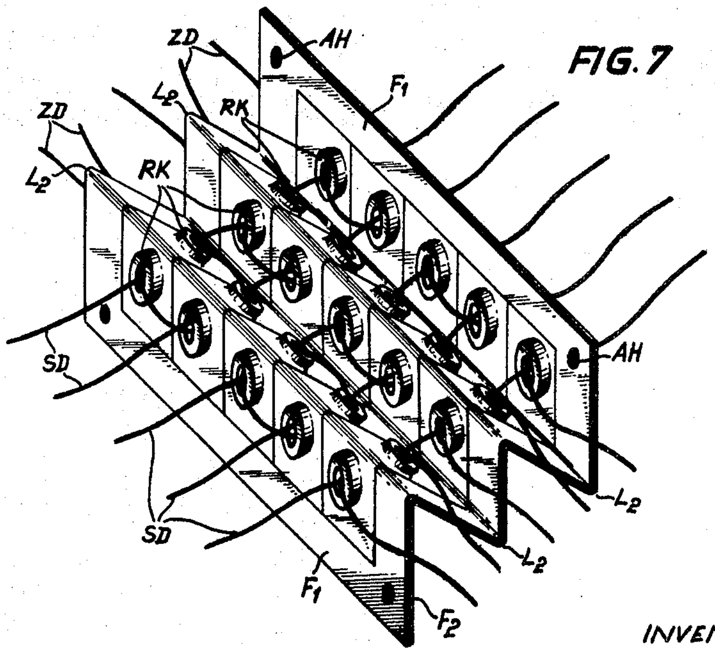

In FIG. 2 reference letters ZD have been applied to indicate vertical conductors or wires, and reference letters SD have been applied to indicate horizontal conductors or wires. To achieve the kind of wiring shown in FIG. 2 one proceeds as indicated in FIGS. 6 and 7. A first support $F_1$, $F_2$ with the cores RK sandwiched between its constituent sheets $F_1$ and $F_2$ and immobilized in their relative positions is folded in zig-zag fashion along a first system of parallel lines $L_1$. By so doing a first group of registering cores is formed, i.e. all cores which are arranged according to FIG. 2 in vertical lines are superimposed or brought into registering positions. Now it is easy to thread vertical wires ZD through the perforations B (FIG. 2) and through the center regions of all registering cores. Upon having thus inserted vertical wires ZD support $F_1$, $F_2$ is first unfolded and then refolded with the wires ZD remaining in position in the core centers through which they have been previously threaded. The way in which support $F_1$, $F_2$ is refolded has been shown in FIG. 7. Refolding is effected substantially in zig-zag fashion along a second system of parallel lines $L_2$ angularly related to the aforementioned system of parallel lines $L_1$. As shown in FIGS. 6 and 7, the two systems of parallel lines $L_1$ and $L_2$ intersect at right angles. The angular relation of the two systems of lines $L_1$, $L_2$ may, however, be different. Both systems $L_1$, $L_2$ may intersect, for instance, at an angle of 45 degrees, as will be shown below more in detail. Upon refolding support $F_1$, $F_2$ as shown in FIG. 7 registration, or superposition, of all cores RK is effected which, according to FIG. 2, are arranged in horizontal lines. This makes it possible to readily thread wires SD through the center regions of superimposed cores RK and through perforations B in registry therewith. Thereupon support $F_1$, $F_2$ is being unfolded and all cores RK are relocated in a common plane, as shown in FIG. 2. FIG. 2 shows also the complete wiring ZD, SD achieved concomitant with the above described dual folding process.

It is often necessary to provide magnetic core memories wherein individual cores are arranged in a square lattice pattern as shown in FIG. 2 with wiring which projects through the constituent cores of the memory along a system of lines parallel to the diagonals of the lattice pattern. This can readily be achieved by means of folding operations similar to those shown in FIGS. 6 and 7 and described in connection therewith, except that support $F_1$, $F_2$ is once folded along a system of lines parallel to the diagonals of the square lattice pattern. By so doing stacks of cores RK are formed which comprise cores situated along diagonals of the lattice pattern when supports $F_1$, $F_2$ are in their nonfolded position shown in FIG. 2.

It will be apparent from the foregoing that in a memory manufactured according to this invention each toroidal core is enclosed in an individual gas-tight pocket. It will also be apparent that conductor means or wires ZD, SD are free from stresses and strains incident to a core supporting function of the same.

It will also be apparent from the foregoing that to bring cores in register by folding, the cores must be located equidistant from the fold line and each pair of cores must be located on a line normal or at right angles to the fold line. Therefore the cores must be located at the points of intersection of a rectilinear grid with the fold lines midway between the grid lines, or on 45 degree diagonals passing midway between the grid intersections at which the cores are located.

It will be understood that I have illustrated and described herein preferred embodiments only of the invention, and that various alterations may be made in the details thereof without departing from the spirit and scope of the invention as defined in the appended claims.

I claim as my invention:

1. A process for manufacturing magnetic core memories comprising the steps of securing a plurality of toroidal magnetic cores arranged along a straight line to a pliable sheet support in such a way as to preclude relative movement between said plurality of cores and said support, of folding said support substantially in zig-zag fashion along fold lines each at right angles to said straight line and each equi-distantly spaced from a pair of contiguous cores forming part of said plurality of cores and thereby effecting registration of said plurality of cores, of threading conductors through the center regions of said plurality of cores, and of thereafter unfolding said support and thereby relocating said plurality of cores substantially in a common plane.

2. A process for manufacturing magnetic core memories comprising the steps of arranging a plurality of toroidal magnetic cores along a straight line in a common plane between a pair of pliable sheets, of providing means on said pair of sheets substantially precluding relative movement between said plurality of cores and said pair of sheets, of folding said pair of sheets along fold lines each at right angles to said straight line and each equidistantly spaced from a pair of contiguous cores forming part of said plurality of cores and thereby effecting registration of said plurality of cores, of threading conductors through the center regions of said plurality of cores, and of thereafter unfolding said pair of sheets and thereby relocating said plurality of cores in said common plane.

3. A process for manufacturing magnetic core memories comprising the steps of arranging a plurality of toroidal magnetic cores on a pliable sheet support each at a point of intersection of the lines of a rectilinear grid, of providing means on said support substantially precluding relative movement between said plurality of cores and said support, of folding said support substantially in zig-zag fashion along a first system of parallel lines at right angles to the columns of said grid and each each midway between pairs of contiguous cores forming part of a column of said grid, and thereby effecting registration of cores pertaining to the same column of said grid, of threading conductors through the center regions of registering cores, of unfolding said support, of refolding said support substantially in zig-zag fashion along a second system of parallel lines at right angles to rows of said grid and each midway between pairs of contiguous cores forming part of a row of said grid and thereby effecting registration of cores pertaining to the same rows of said grid, of threading conductors through the center regions of registering cores, and of thereafter unfolding said support.

4. A process for manufacturing magnetic core memories comprising the steps of arranging a plurality of toroidal magnetic cores on a pliable sheet support each at a point of intersection of the lines of a rectilinear grid, of providing means on said support substantially precluding relative movement between said plurality of cores and said support, of folding said support substantially in zig-zag fashion along a first system of lines parallel to a first 45 degree diagonal of said grid and each passing midway between grid intersections at which magnetic cores are located and by so folding said support effecting registration of cores aligned along lines extending at right angles to said first 45 degree diagonal of said grid, of threading conductors through the center regions of registering cores, of unfolding said support, of refolding said support substantially in zig-zag fashion along a second system of lines parallel to a second 45 degree diagonal of said grid and each passing midway between grid intersections at which magnetic cores are located and by so folding said support effecting registration of cores aligned along lines at right angles to said second 45 degree diagonal of said grid, of threading conductors through the center regions of registering cores, and of thereafter unfolding said support.

5. A process for manufacturing magnetic core memories comprising the steps of:
   (a) arranging a plurality of toroidal magnetic cores between a pair of sheets of a thermoplastic synthetic substance each at a point of intersection of lines of a rectilinear grid including columns and rows;
   (b) establishing by application of heat and pressure a system of substantially toroidal chambers each housing one of said plurality of cores and establishing by application of heat and pressure a system of welds parallel to said lines of said grid;
   (c) folding said pair of sheets substantially in zig-zag fashion along a first system of lines at right angles to said columns of said grid and each midway between pairs of contiguous cores forming part of a column of said grid and thereby effecting registration of cores pertaining to the same columns of said grid;
   (d) threading conductors through the center regions of registering cores;
   (e) unfolding said pair of sheets;
   (f) refolding said pair of sheets substantially in zig-zag fashion along a second system of lines at right angles to said rows of said grid and each midway between pairs of contiguous cores forming part of a row of said grid and thereby effecting registration of cores pertaining to the same rows of said grid;
   (g) threading conductors through the center regions of registering cores; and
   (h) thereafter unfolding said pair of sheets.

6. A process for manufacturing magnetic core memories comprising the steps of:
   (a) arranging a plurality of toroidal magnetic cores between a pair of sheets of a thermoplastic substance each at a point of intersection of lines of a rectilinear grid;
   (b) establishing by application of heat and pressure a system of substantially toroidal chambers each housing one of said plurality of cores and establishing by the application of heat and pressure a system of welds parallel to the lines of said grid;

(c) folding said pair of sheets substantially in zig-zag fashion along a first system of lines parallel to a first 45 degree diagonal of said grid and each passing midway between intersections at which magnetic cores are located and by so folding said pair of sheets effecting registration of cores aligned along lines at right angles to said first 45 degree diagonal of said grid;
   (d) threading conductors through the center regions of registering cores;
   (e) unfolding said pair of sheets;
   (f) refolding said pair of sheets substantially in zig-zag fashion along a second system of lines parallel to a second 45 degree diagonal of said grid and each passing midway between grid intersections at which magnetic cores are located and by so folding said pair of sheets effecting registration of cores aligned along lines at right angles to said second 45 degree diagonal of said grid;
   (g) threading conductors through the center regions of registering cores; and
   (h) thereafter unfolding said pair of sheets.

References Cited by the Examiner

UNITED STATES PATENTS

| | | | |
|---|---|---|---|
| 2,911,605 | 11/59 | Wales | 29—155.5 |
| 2,901,736 | 8/59 | Sylvester | 340—174 |
| 2,934,748 | 4/60 | Steimen | 340—174 |
| 2,961,745 | 11/60 | Smith | 29—155.5 |
| 2,978,683 | 4/61 | Alexander | 340—174 |
| 2,985,948 | 5/61 | Peters | 29—155.5 |

WHITMORE A. WILTZ, *Primary Examiner.*

JOHN BURNS, JOHN F. CAMPBELL, *Examiners.*